Figure 1:
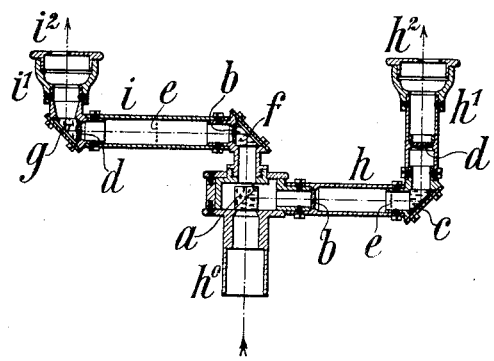

M. VON ROHR.
SUPPLEMENTARY OPTICAL INSTRUMENT.
APPLICATION FILED JAN. 27, 1909.

983,569.

Patented Feb. 7, 1911.

Witnesses:
Paul Krüger
Richard Hahn

Inventor:
Moritz von Rohr

UNITED STATES PATENT OFFICE.

MORITZ VON ROHR, OF JENA, GERMANY, ASSIGNOR TO THE FIRM OF CARL ZEISS, OF JENA, GERMANY.

SUPPLEMENTARY OPTICAL INSTRUMENT.

983,569. Specification of Letters Patent. Patented Feb. 7, 1911.

Application filed January 27, 1909. Serial No. 474,494.

*To all whom it may concern:*

Be it known that I, MORITZ VON ROHR, a citizen of the German Empire, and residing at Carl-Zeiss strasse, Jena, in the Grand Duchy of Saxe-Weimar, Germany, have invented a new and useful Supplementary Optical Instrument, of which the following is a specification.

The invention consists in an optical instrument, which is designed for adaptation behind any monocular instrument: magnifier, microscope, endoscope or telescope, and which converts this monocular instrument into a binocular one without materially reducing the objective field of view, the monocular instrument together with its supplement being hereinafter called the total instrument. The necessary constituent parts of such a binocular supplementary instrument are a dividing prism system and two reproducing lens systems. The dividing prism system divides the system of pencils of parallel rays, which reproduce the object at a great distance, emerging from the monocular instrument into two partial systems, one for each eye of the observer. This prism system admits of construction in all those forms which have been employed in the binocular microscope with common objective for dividing the system of pencils of convergent rays emerging from the objective and which, as is well known, can be classified into two groups, according as the pencil system is divided physically, that is to say, as regards the individual rays divided, or only geometrically, *i. e.*, as a whole. A transparent and, at the same time, reflecting layer effects the physical division. Instead of being inclosed in a prism system, such a layer can be also arranged on a glass plate or may even consist of such a plate. Geometrical division should as much as possible take place in the exit pupil of the monocular instrument. It can not only be realized by reflecting but also by refracting prism systems, reflectors of course being capable of taking the place of reflecting prism systems. The two reproducing lens systems preserve to the binocular instrument the objective field of view of the monocular instrument wholly undiminished or but very slightly reduced in size, in that they reproduce the exit pupil of this instrument twice in physical division of the pencil system, or in geometrical division each partial pupil once, as exit pupils of the total instrument with the same magnification. Since the two images of the object, which the total instrument presents, must lie at a great distance as the image presented by the monocular instrument does, each lens system must allow the pencils entering with parallel rays to emerge again with parallel rays, in other words, it must be a telescopic system. As additional constituent parts of the supplementary instrument reflecting prisms may still be necessary, in order to give the axes of the two partial pencil systems parallel or weakly diverging directions, provided they have not already received such directions from the dividing prism system, to deflect these axes, for the purpose of enabling the supplementary instrument to be adapted to the inter-pupillary distance, or to produce additional reflections for rectifying a reverse position of the images.

In employing geometrical division, the distant virtual images of the object, which are visible to the eyes of the observer, represent stereoscopic component images, and pseudoscopic effect is to be avoided by arranging the images according to well known rules. In physical division the distant virtual images are identical and combine in being viewed with the two eyes into an indifferent image. If, however, on the inner sides of the exit pupils of the total instrument, *i. e.*, on the sides adjacent to one another, or only on the inner side of one of the two exit pupils a smaller or larger portion be stopped out, the conversion of the images visible to the eyes into stereoscopic images is also, as is well known, obtained. Physical division has therefore the advantage of being able to realize not only stereoscopic but also indifferent vision.

The idea of converting a monocular microscope by means of a dividing prism system arranged behind it into a binocular one has already been made public in print, but was at the same time abandoned because of the reduced field of view to be expected. On the other hand the proposal of the combination of a dividing prism system, which acts geometrically, with two astronomical telescopes has been already published, according to which these three constituent parts were to be combined with an objective to form a binocular microscope. Accordingly, the invention represents an application of the well known combination of a dividing prism system with two telescopic systems for the solution of the well known problem of converting a monocular instrument into a binocular one by a supplementary instrument without reducing the objective field of view.

Figure 2:
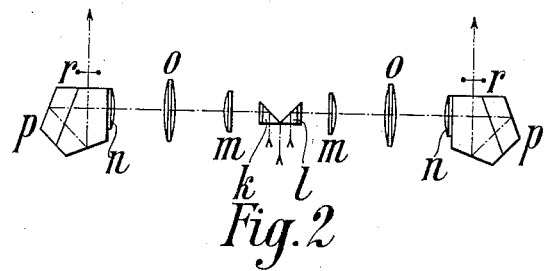
Figure 3:
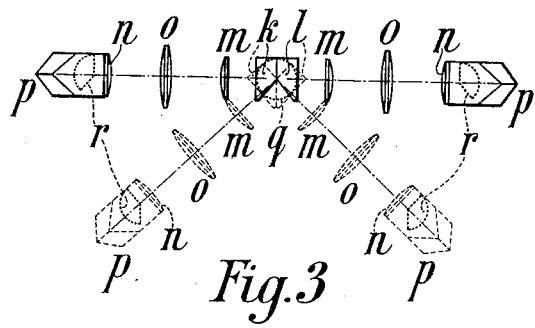

In the annexed drawing: Figure 1 is an axial section through a supplementary instrument for a cystoscope. Fig. 2 is an elevation of the optical parts of a supplementary instrument for a magnifier. Fig. 3 is a plan view of the same parts.

Referring to Fig. 1, a Swan cube $a$ with transparent silver layer serves as the dividing prism system. Hence physical division is employed. The partial pencil system deflected toward the right passes through the objective lens $b$, the reflecting prism $c$ and the ocular lens $d$. The two lenses have equal focal length, the image $e$ of the object projected by the objective lens $b$ lies therefore midway between them and the magnification of the telescope is unity. The other partial pencil system passes at first through a reflecting prism $f$ deflecting toward the left, then through similar lenses $b$ and $d$ as in the right telescope and finally through a second reflecting prism $g$. On the casing two main parts are to be distinguished, one part $h$ fixed and one $i$ rotatable. The fixed main part has a tube $h^0$, by means of which the supplementary instrument is slipped on the ocular of the monocular instrument. The axis of rotation of the main part $i$ coincides with the axis of the tube $h^0$. The ocular tubes $h^1$ and $i^1$ of the two main parts have in the position of the rotatable main part $i$ shown in the drawing, in which the axes of both partial pencil systems rest in the same plane, their greatest distance apart. By rotating the main part $i$ this distance can be reduced to suit the inter-pupillary distance of the observer. On the ocular tubes $h^1$ and $i^1$ removable covers $h^2$ and $i^2$ are placed, each with an aperture in approximately the form of a semicircle, the center of which lies in the axis of the partial pencil system. The place of the cover on this axis is chosen, so that the exit pupil of the monocular instrument, which when the supplementary instrument is slipped on, falls near to the entrance surface of the cube $a$, is reproduced in the plane of the cover aperture. If the covers have the position as shown, in which the apertures lie toward the outside, stereoscopic component images are presented to the eyes of the observer. When the covers are removed, the images become identical, and the observer perceives an indifferent image. Since both the astronomical telescopes $b$ $d$ have an image-inverting effect, the images presented to the observer are erect, if the monocular instrument supplies an inverted image, and inversely.

In the example shown in Figs. 2 and 3 geometrical division is made use of. The dividing prism system consists of two reflecting prisms $k$ and $l$. The objective lenses $m$ and the ocular lenses $n$ have here also equal focal length, but in this case, where a monocular instrument is supposed to have a large apparent field of view, a collective lens $o$ is arranged in the image field of each telescope. The ocular prisms $p$ have one simple reflecting and one ridge surface each, so that the supplementary instrument in itself provides erect images. If this instrument be attached behind the monocular one, so that the exit pupil $q$, Fig. 3, of the latter falls in the entrance surface of the prisms $k$ and $l$, then the images $r$ of the two parts of $q$ projected by the telescopes lie above the ocular prisms, conveniently accessible to the eye of the observer. Since these exit pupils of the total instrument, as erected images of the parts of the exit pupil of the monocular instrument, turn the dividing lines toward one another, the component images presented to the eye of the observer are stereoscopic. For adapting the distance between the oculars to the inter-pupillary distance, the two symmetrical halves of the supplementary instrument are capable of being rotated, as indicated by dotted lines in Fig. 3, about the common entrance axis, if, as shown, the prisms $k$ and $l$ are suitably truncated. Through this truncation, it is true, a small portion of the rays emerging from the monocular instrument are lost. On that account also the images $r$ of the partial pupils appear correspondingly cut down.

I claim:

A supplementary instrument for converting a monocular instrument into a binocular one, the optical components of this supplementary instrument being arranged in a dividing prism system and two telescopic systems, the latter systems being located each behind one of the exit surfaces of the former system.

MORITZ VON ROHR.

Witnesses:
PAUL KRÜGER,
FRITZ LANDER.